(12) United States Patent
Chan et al.

(10) Patent No.: US 7,459,660 B2
(45) Date of Patent: Dec. 2, 2008

(54) SYSTEM AND METHOD FOR CALIBRATING LIGHT EMITTING DEVICE

(75) Inventors: Kun-Yi Chan, Changhua County (TW); Shang-Pin Sun, Hsin-Chu County (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 0 days.

(21) Appl. No.: 10/711,789

(22) Filed: Oct. 5, 2004

(65) Prior Publication Data

US 2006/0071145 A1    Apr. 6, 2006

(51) Int. Cl.
*G01J 1/32* (2006.01)

(52) U.S. Cl. ................... 250/205; 369/13.26

(58) Field of Classification Search ......... 250/205, 250/201.5; 359/719; 369/13.26
See application file for complete search history.

(56) References Cited

U.S. PATENT DOCUMENTS

| | | | | |
|---|---|---|---|---|
| 5,040,163 A | * | 8/1991 | Sasaki et al. | 369/116 |
| 5,340,974 A | * | 8/1994 | Zalewski | 250/205 |
| 5,563,862 A | * | 10/1996 | Udagawa | 369/53.24 |
| 5,627,813 A | * | 5/1997 | Miyashita | 369/116 |
| 5,640,381 A | | 6/1997 | Call et al. | |
| 5,753,903 A | * | 5/1998 | Mahaney | 250/205 |
| 6,303,917 B1 | * | 10/2001 | Hawryluk | 250/205 |
| 6,580,531 B1 | | 6/2003 | Swanson et al. | |
| 6,629,638 B1 | | 10/2003 | Sanchez | |
| 2003/0072235 A1 | * | 4/2003 | Naoi et al. | 369/53.18 |
| 2003/0208332 A1 | | 11/2003 | Liu et al. | |
| 2003/0235126 A1 | * | 12/2003 | Kawakami et al. | 369/53.22 |
| 2004/0013065 A1 | * | 1/2004 | Udagawa | 369/47.51 |
| 2004/0041571 A1 | * | 3/2004 | Lin | 324/601 |
| 2004/0079864 A1 | * | 4/2004 | Suzuki | 250/205 |
| 2004/0099788 A1 | * | 5/2004 | Hedin et al. | 250/205 |
| 2004/0188591 A1 | * | 9/2004 | Hsu et al. | 250/205 |

* cited by examiner

*Primary Examiner*—Georgia Y Epps
*Assistant Examiner*—Kevin Wyatt
(74) *Attorney, Agent, or Firm*—Winston Hsu

(57) ABSTRACT

A light emitting device calibration system includes a device under test including a light emitting device to be calibrated and a microprocessor electrically coupled to the light emitting device. A light detector is coupled to the device under test. During a calibration mode, the microprocessor controls power of the light emitting device by changing values of a drive signal to the light emitting device, receives a power indication corresponding to light emitted by the light emitting device, and determines a power relationship relating values of the drive signal to powers of the light emitting device according to a power indication for each of a plurality of values of the drive signal. The light detector coupled to the device under test detects the light emitted by the light emitting device to generate the power indication corresponding to the light emitted by the light emitting device.

44 Claims, 7 Drawing Sheets

SYSTEM AND METHOD FOR CALIBRATING LIGHT EMITTING DEVICE

BACKGROUND

The invention generally relates to optical recording and storage drives, and more particularly, to a system and a method for calibrating the proper output power of a light emitting device.

As requirements for high volume storage mediums continue to increase, compact disks (CDs) are playing a more important role. During the recording process, pits are created on the CD by an optical pickup unit (OPU) of the CD recorder when by emitting a light beam on a dye layer. Lands are formed on the CD when no light beam is emitted thereon. Pits have a lower reflectivity than the lands, and pits and lands represent the information of 0 and 1.

However, pits produced by laser beams of different output power levels from different CD recorders are usually shaped differently, which causes difficulty in the process of reproducing the recorded information. This is a result of the variation in the assembly of the OPU and inconsistencies in the photo diode properties. Therefore, the CD recorder has to have its laser power calibrated prior to the fab-out stage so that the OPU can provide laser beams of the correct power.

FIG. 1 shows a power calibration system 100 as disclosed by Liu, et al. in published U.S. Patent Application No. 2003/0208332A1. Referring to FIG. 1, the power calibration system 100 is used for calibrating a laser diode 102, wherein the laser diode 102 is positioned within an optical recording drive 104. The optical recording drive 104 comprises a CD plate 106, which can move in and out of the optical recording drive 104. During calibration, a first module 108 is positioned upon the laser diode 102 in order to receive the laser beam from laser diode 102. The second module 110 is coupled to the first module 108 and a computer 112, and the computer 112 is coupled to the first module 108 and the optical recording drive 104.

Although not shown, in addition to requiring control to be performed by the computer 112, the power calibration system 100 requires the application of a standard photo diode to be used with the power calibration system. These requirements significantly increase the manufacturing costs. Additionally, in order to command the laser diode 102 of the optical recording drive 104 to progressively emit light beams of increasing power levels, the optical recording drive 104 must be equipped with some kind of a digital port to receive commands from the computer 112. For computer based peripherals, an ATAPI interface is typically used for this purpose. However, in order to reduce costs, stand-alone consumer electronic DVD recorders are not equipped with ATAPI interfaces because they are not needed during normal operations. Therefore a light emitting device calibration method for the laser diode of DVD recorders and other products having light emitting devices is required.

SUMMARY

One objective of the claimed invention is therefore to provide a light emitting device calibration system not requiring control from an external computer, to solve the above-mentioned problems.

According to an exemplary embodiment of the claimed invention, a light emitting device calibration system is disclosed comprising: a device under test including: a light emitting device to be calibrated; and a microprocessor electrically coupled to the light emitting device for during a calibration mode controlling power of the light emitting device by changing values of a drive signal to the light emitting device, receiving a power indication corresponding to light emitted by the light emitting device, and determining a power relationship relating values of the drive signal to powers of the light emitting device according to a power indication for each of a plurality of values of the drive signal; and a light detector coupled to the device under test for detecting the light emitted by the light emitting device to generate the power indication corresponding to the light emitted by the light emitting device.

According to another exemplary embodiment of the claimed invention, a method is disclosed for light emitting device calibration. The method comprises: providing a device under test having a light emitting device to be calibrated and a microprocessor; providing a light detector; controlling power of the light emitting device using the microprocessor by changing values of a drive signal to the light emitting device; detecting light emitted by the light emitting device and generating a power indication corresponding to light emitted by the light emitting device using the light detector; receiving the power indication using the microprocessor; and determining a power relationship relating values of the drive signal to powers of the light emitting device using the microprocessor according to the power indication for a plurality of values of the drive signal.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
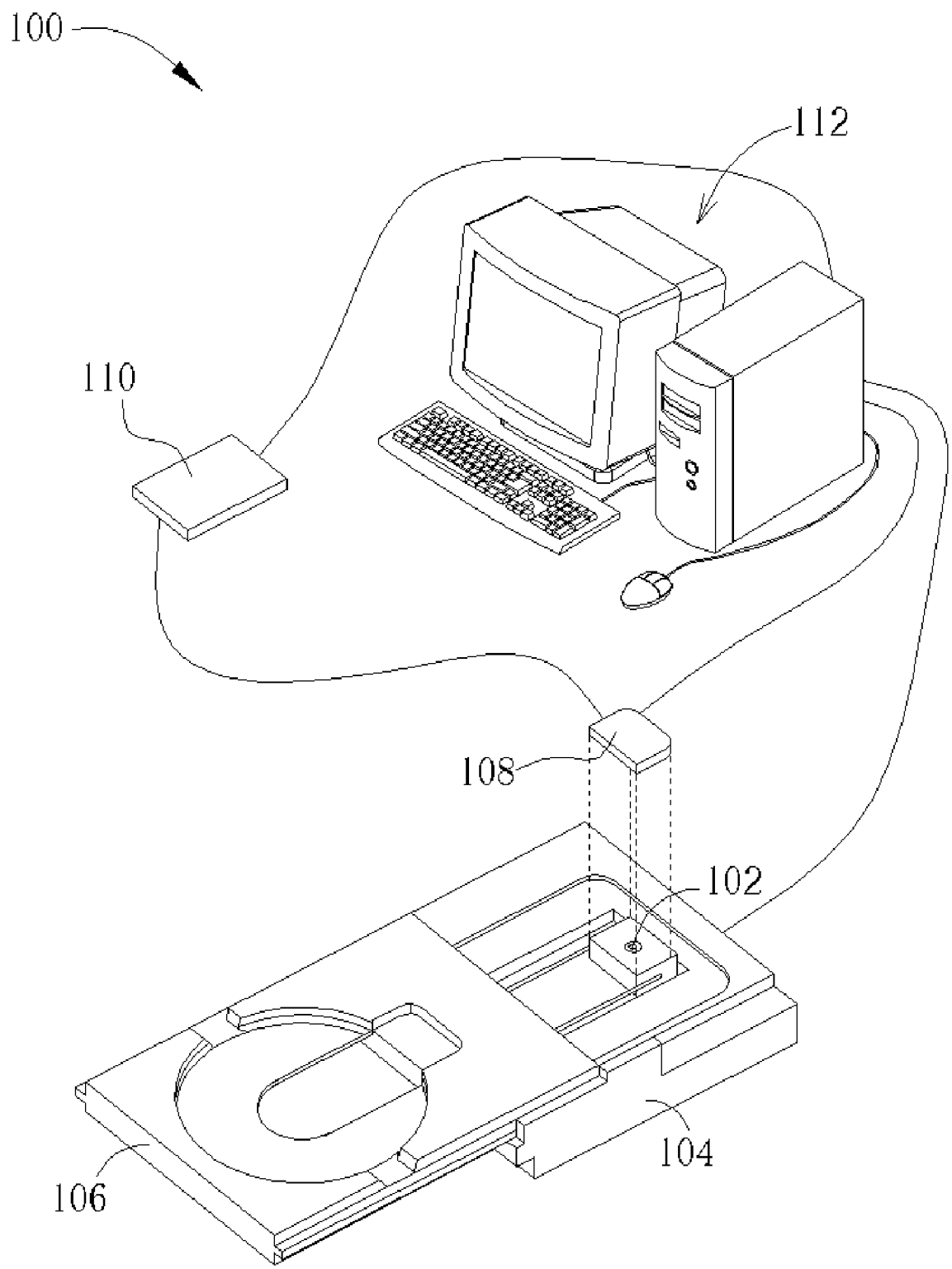
FIG. 1 shows a power calibration system according to the related art.
Figure 2:
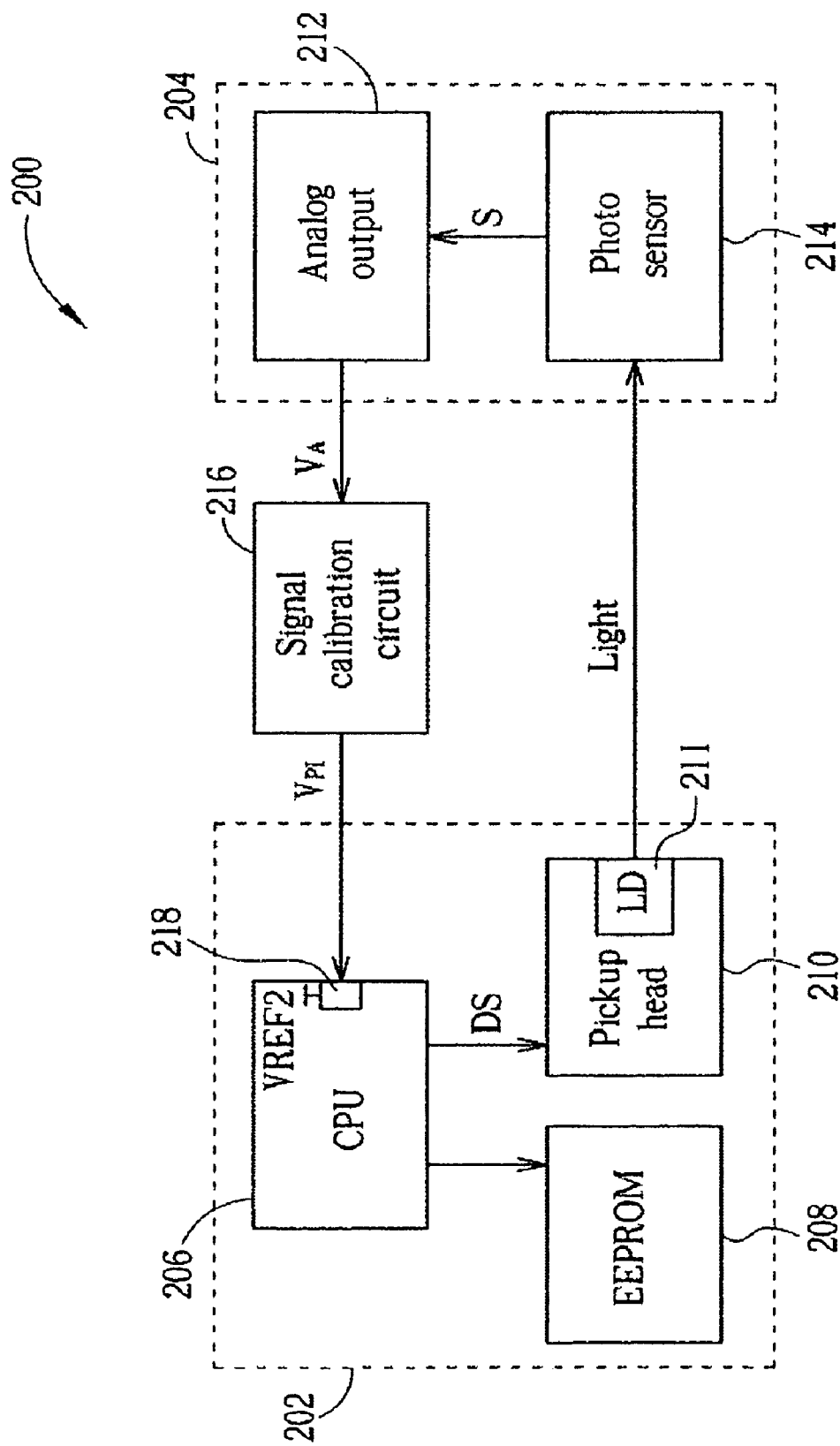
FIG. 2 shows a first power calibration system according to a first exemplary embodiment of the present invention.

FIG. 2 shows a first power calibration system 200 according to a first exemplary embodiment of the present invention. The first power calibration system 200 includes a device under test 202, a light detector such as a power meter 204 coupled to the device under test 200, and a signal calibration circuit 216. The device under test 202 includes a microprocessor being a central processing unit (CPU) 206, an non-volatile memory being an electrically erasable programmable read only memory (EEPROM) 208, and a pickup head 210 for controlling a light emitting device being a laser diode (LD) 211. The power meter 204 includes a photo sensor 214 and an output generator 212.

After assembly at the manufacturer, the first calibration system 200 is used to calibrate the laser power of the LD 211.

Power is applied to device under test 202 and the CPU 206 enters a calibration mode. For example, a jumper in the device under test 202 could be shorted to control the CPU 206 to enter the calibration mode, or other methods such as temporally loading program code corresponding to the calibration mode into the EEPROM 208 for execution by the CPU 206 at power-on. Once in the calibration mode, the CPU 206 controls the output power of the LD 211 by changing values of a drive signal DS to the pickup head 210. A plurality of different values of the drive signal DS are outputted by the CPU 206. The pickup head 210 drives the LD 211 at an output power level corresponding to the value of the drive signal DS. Light emitted by the LD 211 is received by the photo sensor 214 of the power meter 204, and an electrical signal S corresponding to the intensity of the received light is passed to the output generator 212. In this embodiment, the output generator 212 of the power meter 204 generates an analog signal $V_A$ being proportional to the intensity of the light received by the photo sensor 214. The outputted analog signal $V_A$ is therefore also proportional to the output laser power of the LD 211. For example, in this embodiment, the analog signal $V_A$ is a changing voltage level. The signal calibration circuit 216 receives the analog signal $V_A$ and outputs a power indication signal $V_{PI}$ being inversely proportional to the analog signal $V_A$. Therefore, the power indication signal $V_{PI}$ is also inversely proportional to the output laser power of the LD 211. The CPU 206 receives the power indication $V_{PI}$ on an analog input pin of the CPU 206 connected to an analog to digital converter 218 of the CPU 206. The CPU then determines a power relationship relating values of the drive signal DS to output powers of the LD 211 according to a different power indication $V_{PI}$ for each of a plurality of different values of the drive signal DS.

Figure 3:
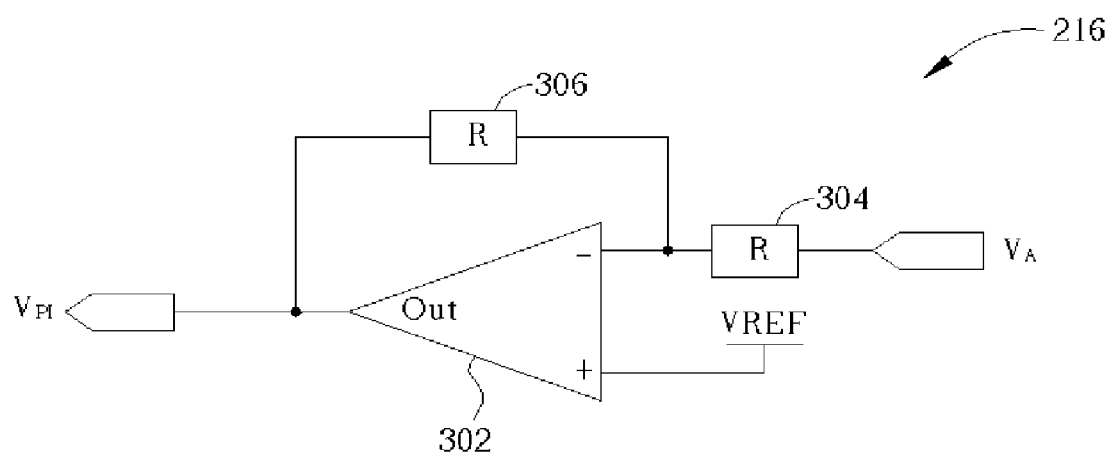
FIG. 3 shows an example implementation of the signal calibration circuit of FIG. 2.

FIG. 3 shows an example implementation of the signal calibration circuit 216 according to this embodiment of the present invention. The signal calibration circuit 216 includes an operational amplifier (op-amp) 302, a voltage reference source VREF, a first resistor 304, and a second resistor 306. The op-amp 302 has an inverting terminal (−), a non-inverting terminal (+), and an output terminal Out, where the output terminal Out is for outputting the power indication $V_{PI}$. The voltage reference source VREF is of a predetermined voltage value and is coupled to the non-inverting terminal (+) of the op-amp 302. The first resistor 304 has a first end coupled to the analog signal $V_A$ outputted by the power meter 204, and a second end coupled to the inverting terminal (−) of the Op-Amp 302. The second resistor 306 has a first end coupled to the inverting terminal (−) of the Op-Amp 302, and a second end coupled to the output terminal and the power indication signal $V_{PI}$.

As will be well easily recognized by a person of ordinary skill in the art, if the first resistor 304 has the same value as the second resistor 306, the power indication signal $V_{PI}$ outputted by the signal calibration circuit 216 corresponds to the following formula:

$$V_{PI} = 2 \cdot \text{VREF} - V_A \quad \text{(Formula 1)}$$

In this way, the signal calibration circuit 216 outputs a power indication $V_{PI}$ having an inverse relationship with the analog signal $V_A$. Because the voltage reference source VREF has a predetermined voltage value, when the LD 211 is turned off and therefore not emitting any light, the analog signal $V_A$ will be zero volts and the power indication signal $V_{PI}$ will have a voltage value equal to 2VREF. Therefore, by outputting a value of the drive signal DS (for example a value of zero) causing no light to be emitted by the LD 211, the CPU 206 can sample the incoming power indication $V_{PI}$ and determine a voltage gain GAIN of the power calibration system 200. This voltage gain GAIN is caused due to an uncertainty of a second reference voltage VREF2 of the analog to digital converter 218 of the CPU 206. The voltage gain GAIN corresponds to the following formula:

$$\text{GAIN} = (2 \cdot \text{VREF})/(V_{CPU}), \quad \text{(Formula 2)}$$

where $V_{CPU}$ is the value of the power indication signal $V_{IP}$ as sampled by the analog to digital converter 218 of the CPU 206.

The CPU 206 uses this gain value during calibration to correct the values measured by the analog to digital converter 218 for the received power indications $V_{PI}$ of the different drive signal values. In this way, regardless of differences of second reference voltages VREF2 for different CPUs 206, the light emitting calibration system 200 is able to accurately determine the power relationship relating values of the drive signal DS to output powers of the LD 211.

More specifically, the actual laser power of the LD 211 at a particular value of drive signal DS corresponds to the following formula:

$$\text{Laser Power} = (2 \cdot \text{VREF}) - (\text{GAIN} \cdot V_{CPU}) \quad \text{(Formula 3)}$$

Figure 4:
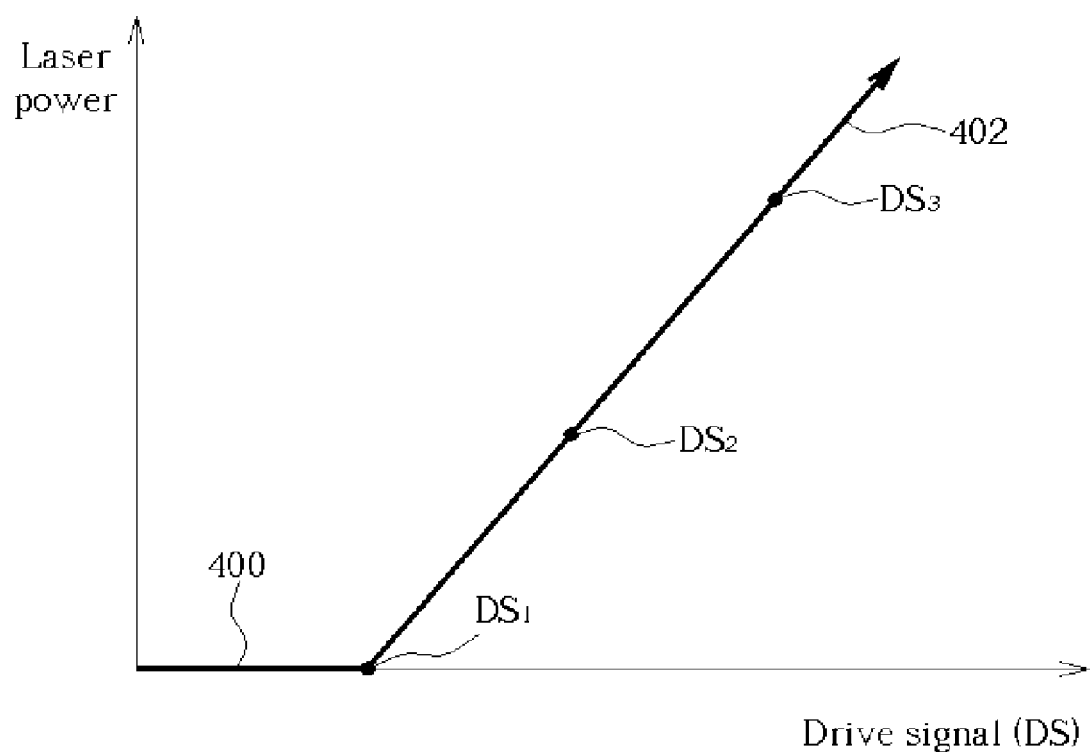
FIG. 4 shows an example power relationship as determined by the CPU during a calibration mode of the device under test shown in FIG. 2.

FIG. 4 shows an example power relationship as determined by the CPU 206 during the calibration mode of the device under test 200 shown in FIG. 2. For lower values of the drive signal DS, there is no light emitted from the LD 211. This offset is shown as a first portion 400 of the power relationship and is caused because of the light emitting properties of the LD 211. At drive signal value DS1, the LD 211 begins to emit light and, during a second portion 402, the power relationship ramps upward in laser power as the drive signal DS increases in value. In this embodiment, the CPU 206 progressively increases the drive signal DS; however, the present invention is not limited to only this embodiment. For example, if the slope of the second portion 402 of the power curve is assumed to be linear, calibration of the LD 211 can be performed using only two values (e.g., DS2 and DS3) of the drive signal DS and extrapolating where the second portion 402 of the power curve will cross zero power. Once determined, the power relationship is stored in the EEPROM 208 by the CPU 206 for usage by the device under test 202 during normal operations. Therefore, during normal operations, the CPU is able to accurately control the power output using different values of the drive signal DS according to desired laser powers.

Figure 5:
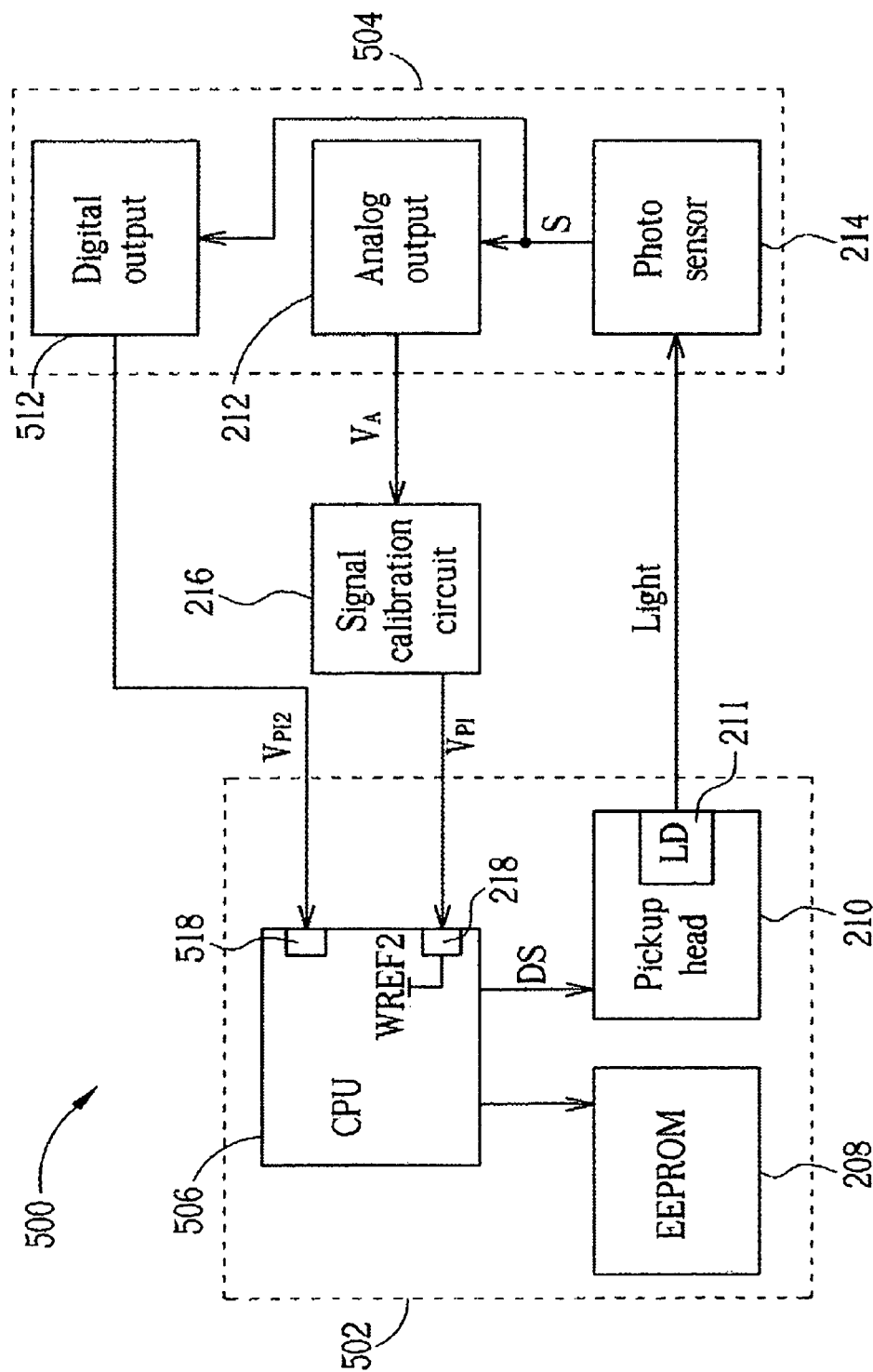
FIG. 5 shows a second power calibration system according to another exemplary embodiment of the present invention.

FIG. 5 shows a second power calibration system 500 according to another exemplary embodiment of the present invention. As shown in FIG. 5, the second power calibration system 500 includes a device under test 502, a light detector such as a power meter 504 coupled to the device under test 502, and a signal calibration circuit such as the signal calibration circuit 216 mentioned above. In the embodiments shown in FIG. 5, the device under test 502 includes a microprocessor being a central processing unit (CPU) 506, a non-volatile memory being the EEPROM 208, and the pickup head 210 for controlling the light emitting device being the LD 211. Please note, the CPU 506 includes an analog to digital converter such as the analog to digital converter 218 mentioned above. However, unlike in the FIG. 2, the CPU 506 shown in FIG. 5 further includes a digital interface 518. In this embodiment, because the power meter 504 includes a digital output interface 512, an accurate power indication value $V_{PI2}$ can be directly generated in the power meter 512 and digitally received by the CPU 518. In this way there is no uncertainty in the received power indication $V_{PI2}$ value. Please note, the power indication $V_{PI2}$ complies with a transmission standard such as RS-232 or universal serial bus (USB), and the digital output interface 512 of the power meter 504 and the digital interface 518 both comply with the transmission standard, too. That is, the digital output interface 512 and the digital interface 518 could be RS-232 or USB interfaces. By relating different resulting digital power indications $V_{PI2}$ for a plurality of different values of the drive signal DS, the CPU 506 can directly determine the power relationship and thereby calibrate the device under test 502.

Although in these embodiments mentioned above, the non-volatile memory 208 is an EEPROM 208, this is not a limitation of the present invention. In another embodiment similar to one of these embodiments, the EEPROM 208 can be replaced with another kind of non-volatile memory 208 such as a FLASH. In addition, although in these embodiments mentioned above, the analog to digital converter 218 is integrated into a microprocessor such as the CPU 206 and the CPU 506, this is not a limitation of the present invention. In another embodiment similar to one of these embodiments, the analog to digital converter 218 can be installed outside the microprocessor such as the CPU 206 and the CPU 506. In another embodiment similar to one of these embodiments, the analog to digital converter 218 can be installed outside the device under test 202 or the device under test 502.

Figure 6:
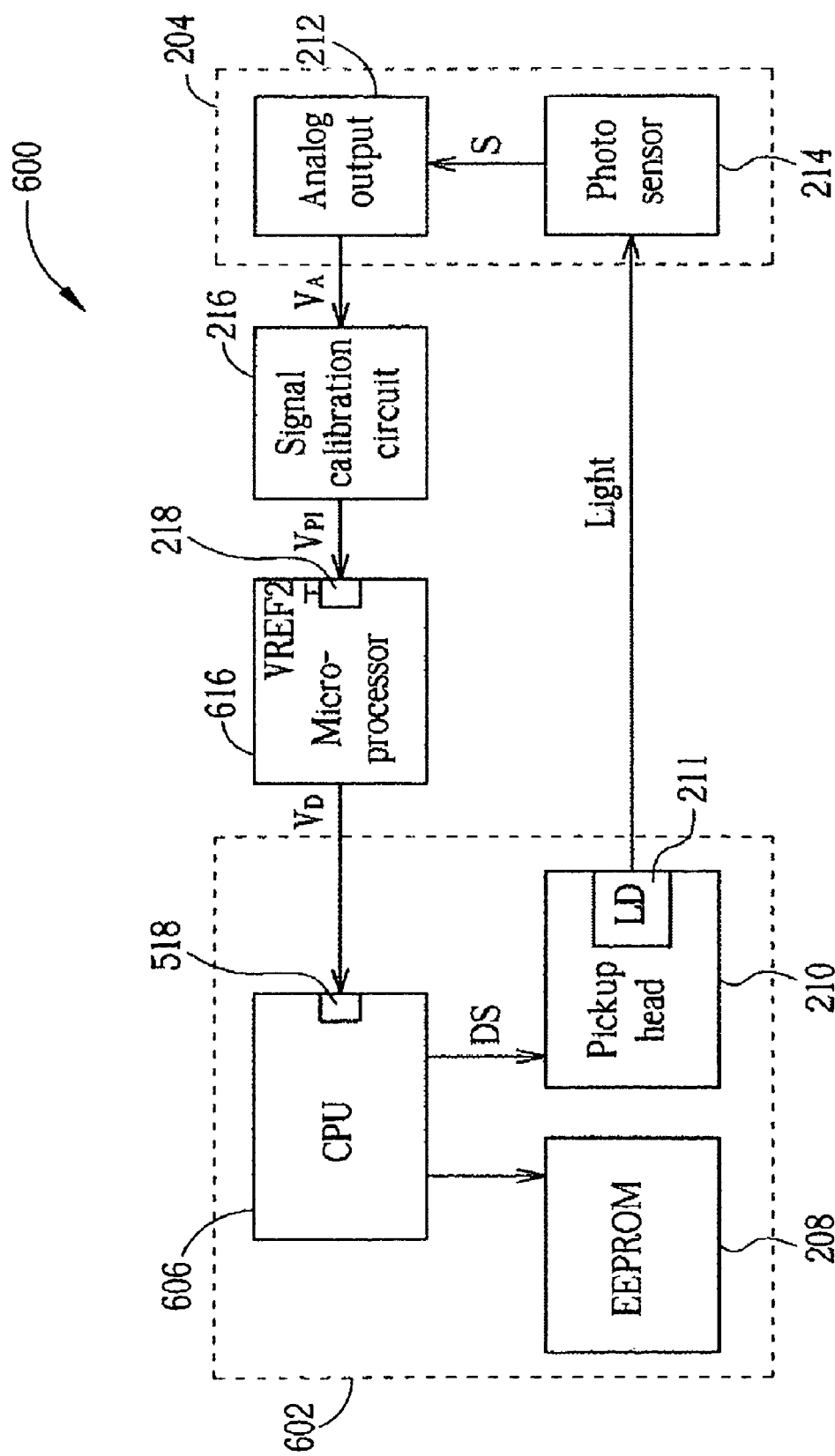
FIG. 6 shows a third power calibration system according to additional exemplary embodiments of the present invention.

FIG. 6 shows a third power calibration system 600 according to additional exemplary embodiments of the present invention. As shown in FIG. 6, the third power calibration system 600 includes a device under test 602, a light detector such as a power meter 204 coupled to the device under test 602, a signal calibration circuit such as the signal calibration circuit 216 mentioned above, and a microprocessor 616. In the embodiments shown in FIG. 6, the device under test 602 includes a microprocessor being a central processing unit (CPU) 606, a non-volatile memory being the EEPROM 208, and the pickup head 210 for controlling the light emitting device being the LD 211. Please note, the CPU 606 includes a digital interface such as the digital interface 518 mentioned above. In addition, the microprocessor 616 shown in FIG. 6 includes an analog to digital converter such as the analog to digital converter 218 mentioned above. The analog to digital converter 218 converts the power indication signal $V_{PI}$ to a digital value $V_{PI-D}$ (not shown) corresponding to the power indication signal $V_{PI}$, and the microprocessor 616 converts the digital value $V_{PI-D}$ to a digital power indication signal $V_D$ corresponding to the digital value $V_{PI-D}$. That is, the digital power indication signal $V_D$ corresponds to the power indication signal $V_{PI}$. In this embodiment, the digital power indication signal $V_D$ complies with a certain transmission standard such as RS-232 or USB, and the digital interface 518 also complies with the transmission standard. That is, the digital interface 518 could be an RS-232 or USB interface.

In contrast to the CPU 206 of the first power calibration system 200 shown in FIG. 2, the microprocessor 616 and the CPU 606 of the third power calibration system 600 shown in FIG. 6 cooperate to fulfill the same functionality of the CPU 206. In another embodiment of the third power calibration system 600, the microprocessor 616 may perform at least the calibration portion of the functionality of the CPU 206.

Figure 7:
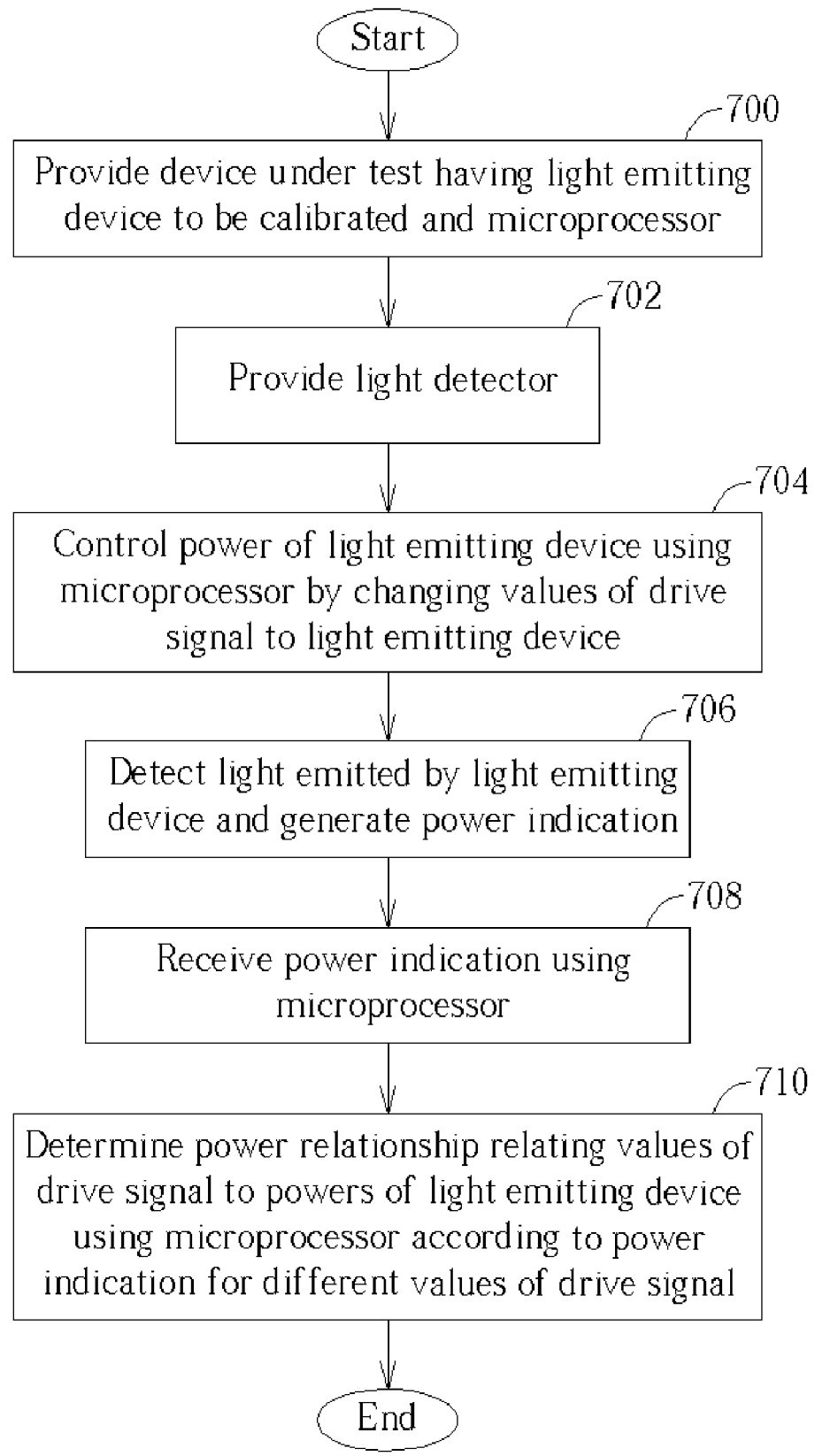
FIG. 7 shows a flowchart describing a general method of light emitting device calibration according to an exemplary embodiment of the present invention.

FIG. 7 shows a flowchart describing a general method of light emitting device calibration according to an exemplary embodiment of the present invention.

Step 700: Provide a device under test having a light emitting device to be calibrated and a microprocessor.

Step 702: Provide a light detector attached to the device under test for detecting light emitted by the light emitting device.

Step 704: Control the power of the light emitting device using the microprocessor by changing values of a drive signal to the light emitting device.

Step 706: Detect the light emitted by the light emitting device and generate a power indication corresponding to the light emitted by the light emitting device using the light detector.

Step 708: Receive the power indication using the microprocessor.

Step 710: Determine a power relationship relating values of the drive signal to powers of the light emitting device using the microprocessor according to the power indication for a plurality of values of the drive signal.

It should be noted that other embodiments of the present invention are also possible. For example, for some optical drives, the pickup head 310 includes both a DVD laser diode and a CD laser diode. In this situation, the above-disclosed method of light emitting device calibration can be used to perform calibration of both the DVD and CD laser diodes separately. In another embodiment, the power relationship relating values of the drive signal DS to output powers of the DVD laser diode is first determined using the above-disclosed method of light emitting device calibration. Afterwards, the power relationship is simply multiplied by a predetermined constant relating output powers of the DVD laser diode to output powers of the CD laser diode (e.g., multiplying by a value of 1.2). Alternatively, the power relationship for the CD laser diode could be determined first and then divided by the above-mentioned predetermined constant. Additionally, the present invention is not limited to using standard power meters. Any light detector or photo sensor can be used receive light emitted by the light emitting device and generate a power indication signal corresponding to the intensity of the light emitted by the light emitting device.

The present invention provides a light emitting calibration system and associated method of light emitting device calibration that does not require a standard laser diode or a GPIB card that is controlled by an external computer. Manufacturing costs are therefore greatly reduced. Additionally, because the calibration process is controlled by a microprocessor embedded in the device under test, the calibration process is simplified and easily automated. An analog to digital converter in the microprocessor can be used by the light emitting device calibration system of the present invention so that no digital interface is needed to be installed on stand-alone consumer electronic DVD recorders. Uncertainty of a reference voltage of the microprocessor analog to digital converter is accounted for by a signal calibration circuit that provides a power indication signal being inversely proportional to an analog signal outputted by a power meter.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light emitting device calibration system for calibrating a light emitting device in an optical disc drive, the light emitting device calibration system comprising:

a laser diode installed within the optical disc drive being the light emitting device to be calibrated;

a microprocessor electrically coupled to the light emitting device for controlling power of the light emitting device by changing values of a drive signal, receiving a power indication signal corresponding to light emitted by the light emitting device, and determining a power relationship relating values of the drive signal to powers of the light emitting device according to the power indication signal for each of the values of the drive signal during a calibration mode;

a light detector for detecting the light emitted by the light emitting device to generate an analog signal being directly proportional to the light emitted by the light emitting device;

a signal calibration circuit having a predetermined reference voltage being coupled between the light detector and the microprocessor for generating the power indication signal having an inverse relationship with the analog signal such that when the analog signal is at the state of no light was emitted by the light emitting device, the power indication signal reaches at a predetermined maximum value, which is a function of the predetermined reference voltage; and a non-volatile memory for storing the power relationship determined by the microprocessor during the calibration mode, wherein the microprocessor uses said power relationship to control values of the drive signal according to desired powers of the light emitting device during a normal operation.

2. The light emitting device calibration system of claim 1, wherein during the calibration mode, the microprocessor adjusts a value of the drive signal so that the light emitting device does not emit any light, calculates a gain of the light emitting device calibration system by measuring a sampled maximum value of the power indication signal as detected by the microprocessor corresponding to the predetermined maximum value of the power indication signal, and correct the power indication signals as measured by the microprocessor for cach of the plurality of values of the drive signal according to the obtained gain.

3. The light emitting device calibration system of claim 2, wherein during the calibration mode, when the analog signal is at the state of no light was emitted by the light emitting device, the power indication signal reaches at a predetermined maximum value, which is substantially equal to two times of the predetermined reference voltage.

4. The light emitting device calibration system of claim 3, wherein the signal calibration circuit comprises:

an operational amplifier having an inverting terminal, a non-inverting terminal, and an output terminal, wherein the output terminal is for outputting the power indication signal;

a voltage reference source being the predetermined voltage value coupled to the non-inverting terminal;

a first resistor having a first end coupled to the analog signal outputted by the power meter, and a second end coupled to the inverting terminal; and a second resistor having a first end coupled to the inverting terminal, and a second end coupled to the output terminal.

5. The light emitting device calibration system of claim 3, wherein during the calibration mode, the gain is calculated by the microprocessor as substantially equal to two times of the predetermined voltage value divided by the sampled maximum value of the power indication signal, which is detected by the microprocessor.

6. The light emitting device calibration system of claim 3, wherein during the calibration mode, the microprocessor is further to correct sampled power indication signal values, which are measured by the microprocessor, and a corrected power indication value is substantially equal to the gain multiplied by a sampled power indication signal value and then subtracted from two times the predetermined voltage value.

7. The light emitting device calibration system of claim 2, wherein power indication signal is a digital signal.

8. The light emitting device calibration system of claim 7, wherein the power indication signal complies with a transmission standard, and the microprocessor includes a digital interface complying with the transmission standard.

9. The light emitting device calibration system of claim 8, wherein the transmission standard is RS-232 or USB.

10. The light emitting device calibration system of claim 2, wherein the non-volatile memory is a EEPROM or a FLASH.

11. The light emitting device calibration system of claim 2, wherein the light detector is a power meter having a photo sensor for receiving the light emitted by the light emitting device, and the power meter outputs the analog signal corresponding to an intensity of the light received at the photo sensor.

12. A method of calibrating a light emitting device in an optical disc drive, the method comprising:

providing a laser diode installed within the optical disc drive being the light emitting device to be calibrated;

controlling power of the light emitting device by changing values of a drive signal to the light emitting device during a calibration mode;

receiving a power indication signal corresponding to light emitted by the light emitting device;

determining a power relationship relating values of the drive signal to powers of the light emitting device according to the power indication signal for each of the values of the drive signal;

detecting the light emitted by the light emitting device to generate an analog signal being directly proportional to the light emitted by the light emitting device;

providing a predetermined reference voltage;

generating the power indication signal having an inverse relationship with the analog signal such that when the analog signal is at the state of no light was emitted by the light emitting device, the power indication signal reaches at a predetermined maximum value, which is a function of the predetermined reference voltage; and storing the power relationship determined during the calibration mode for controlling values of the drive signal according to desired powers of the light emitting device in a normal operation mode.

13. The method of claim 12, further comprising:

adjusting a value of the drive signal until the light emitting device does not emit any light;

calculating a gain of the light emitting device calibration system by measuring a sampled maximum value of the power indication signal as detected corresponding to the predetermined maximum value of the power indication signal; and utilizing the gain to correct the power indication signals for each of the values of the drive signal.

14. The method of claim 13, wherein when the analog signal is at the state of no light was emitted by the light emitting device, the power indication signal reaches a predetermined maximum value, which is substantially equal to two times of the predetermined reference voltage.

15. The method of claim 14, further comprising providing a signal calibration circuit for generating the power indication signal, wherein the signal calibration circuit comprises an operational amplifier having an inverting terminal, a non-inverting terminal, and an output terminal; a voltage reference source being the predetermined voltage value coupled to the non-inverting terminal; a first resistor having a first end coupled to the analog signal outputted by the power meter, and a second end coupled to the inverting terminal; and a second resistor having a first end coupled to the inverting terminal, and a second end coupled to the output terminal.

16. The method of claim 14, further comprising calculating the gain being substantially equal to two times of the predetermined voltage value divided by the sampled maximum value of the power indication signal.

17. The method of claim 14, further comprising correcting sampled power indication signal values to generate corrected values being substantially equal to that two times of the predetermined voltage value subtracts the gain multiplying with a sampled power indication signal value.

18. The method of claim 13, wherein power indication signal is a digital signal.

19. The method of claim 18, wherein the power indication signal complies with a transmission standard.

20. The method of claim 19, wherein the transmission standard is RS-232 or USB.

21. The method of claim 13, further comprising storing the power relationship in a EEPROM or a FLASH.

22. The method of claim 13, providing a power meter having a photo sensor for receiving the light emitted by the light emitting device and outputting the analog signal corresponding to an intensity of the light received at the photo sensor.

23. A light emitting device calibration system for calibrating a light emitting device in an optical disc drive, the light emitting device calibration srtern comprising:
  a laser diode installed within the optical disc drive being the light emitting device to be calibrated;
  a microprocessor electrically coupled to the light emitting device for controlling power of the light emitting device by changing values of a drive signal, receiving a power indication signal corresponding to light emitted by the light emitting device, and determining a rower relationship relating values of the drive signal to powers of the light emitting device according to the
  power indication signal for each of the values of the drive signal during a calibration mode;
  a light detector for detecting the light emitted by the light emitting device to generate an analog signal;
  a signal calibration circuit having a predetermined reference voltage for generating the power indication signal according to the analog signal and the predetermined reference voltage; and
  a non-volatile memory for storing the power relationship determined by the microprocessor during the calibration mode, wherein the microprocessor uses said power relationship to control values of the drive signal according to desired powers of the light emitting device during a normal operation.

24. The light emitting device calibration system of claim 23, wherein during the calibration mode, the microprocessor adjusts a value of the drive signal so that the light emitting device does not emit any light, calculates a gain of the light emitting device calibration system by measuring a sampled maximum value of the power indication signal as detected by the microprocessor corresponding to the predetermined maximum value of the power indication signal, and correct the power indication signals as measured by the microprocessor for each of the plurality of values of the drive signal according to the obtained gain.

25. The light emitting device calibration system of claim 24, wherein during the calibration mode, when the analog signal is at the state of no light was emitted by the light emitting device, the power indication signal reaches at a predetermined maximum value, which is substantially equal to two times of the predetermined reference voltage.

26. The light emitting device calibration system of claim 25, wherein the signal calibration circuit comprises:
  an operational amplifier having an inverting terminal, a non-inverting terminal, and an output terminal, wherein the output terminal is for outputting the power indication signal;
  a voltage reference source being the predetermined voltage value coupled to the non-inverting terminal;
  a first resistor having a first end coupled to the analog signal outputted by the power meter, and a second end coupled to the inverting terminal; and
  a second resistor having a first end coupled to the inverting terminal, and a second end coupled to the output terminal.

27. The light emitting device calibration system of claim 25, wherein during the calibration mode, the gain is calculated by the microprocessor as substantially equal to two times of the predetermined voltage value divided by the sampled maximum value of the power indication signal, which is detected by the microprocessor.

28. The light emitting device calibration system of claim 25, wherein during the calibration mode, the microprocessor is further to correct sampled power indication signal values, which are measured by the microprocessor, and a corrected power indication value is substantially equal to the gain multiplied by a sampled power indication signal value and then subtracted from two times the predetermined voltage value.

29. The light emitting device calibration system of claim 24, wherein power indication signal is a digital signal.

30. The light emitting device calibration system of claim 29, wherein the power indication signal complies with a transmission standard, and the microprocessor includes a digital interface complying with the transmission standard.

31. The light emitting device calibration system of claim 29, wherein the transmission standard is RS-232 or USB.

32. The light emitting device calibration system of claim 24, wherein the non-volatile memory is a EEPROM or a FLASH.

33. The light emitting device calibration system of claim 24, wherein the light detector is a power meter having a photo sensor for receiving the light emitted by the light emitting device, and the power meter outputs the analog signal corresponding to an intensity of the light received at the photo sensor.

34. A method of calibrating a light emitting device in an optical disc drive, the method comprising:
  providing a laser diode installed within the optical disc drive being the light emitting device to be calibrated;
  controlling power of the light emitting device by changing values of a drive signal to the light emitting device during a calibration mode;
  receiving a power indication signal corresponding to light emitted by the light emitting device;
  determining a power relationship relating values of the drive signal to powers of the light emitting device according to the power indication signal for each of the values of the drive signal;
  detecting the light emitted by the light emitting device to generate an analog signal;
  providing a predetermined reference voltage;
  generating the power indication signal according to the analog signal and the predetermined reference voltage; and
  storing the power relationship determined during the calibration mode in a non-volatile memory for controlling values of the drive signal according to desired powers of the light emitting device in a nonnal operation mode.

35. The method of claim 34, further comprising:
adjusting a value of the drive signal until the light emitting device does not emit any light;
calculating a gain of the light emitting device calibration system by measuring a sampled maximum value of the power indication signal as detected corresponding to the predetermined maximum value of the power indication signal; and
utilizing the gain to correct the power indication signals for each of the values of the drive signal.

36. The method of claim 35, wherein when the analog signal is at the state of no light was emitted by the light emitting device, the power indication signal reaches a predetermined maximum value, which is substantially equal to two times of the predetermined reference voltage.

37. The method of claim 36, further comprising providing a signal calibration circuit for generating the power indication signal, wherein the signal calibration circuit comprises an operational amplifier having an inverting terminal, a non-inverting terminal, and an output terminal; a voltage reference source being the predetermined voltage value coupled to the non-inverting terminal; a first resistor having a first end coupled to the analog signal, and a second end coupled to the inverting terminal; and a second resistor having a first end coupled to the inverting terminal, and a second end coupled to the output terminal.

38. The method of claim 36, further comprising calculating the gain being substantially equal to two times or the predetermined voltage value divided by the sampled maximum value of the power indication signal.

39. The method of claim 36, further comprising correcting sampled power indication signal values to generate corrected values being substantially equal to that two times of the predetermined voltage value subtracts the gain multiplying with a sampled power indication signal value.

40. The method of claim 35, wherein power indication signal is a digital signal.

41. The meihod of claim 40, wherein the power indication signal complies with a transmission standard.

42. The method of claim 41, wherein the transmission standard is RS-232 or USB.

43. The method of claim 35, further comprising storing the power relationship in a EEPROM or a FLASH.

44. The method of claim 35, providing a power meter having a photo sensor for receiving the light emitted by the light emitting device and outputting the analog signal corresponding to an intensity of the light received at the photo sensor.

* * * * *